United States Patent
Jones

(10) Patent No.: US 9,577,500 B2
(45) Date of Patent: Feb. 21, 2017

(54) ROTARY CONTINUOUS PERMANENT MAGNET MOTOR

(75) Inventor: Arnold Jones, Fresno, CA (US)

(73) Assignee: Jeremy Hawran, Monterey, CA (US)

( * ) Notice: Subject to any disclaimer, the term of this patent is extended or adjusted under 35 U.S.C. 154(b) by 266 days.

(21) Appl. No.: 13/411,588

(22) Filed: Mar. 4, 2012

(65) Prior Publication Data
US 2013/0229080 A1  Sep. 5, 2013

(51) Int. Cl.
H02K 21/00 (2006.01)
H02K 21/18 (2006.01)
H02K 21/12 (2006.01)
H02K 21/14 (2006.01)

(52) U.S. Cl.
CPC .............. *H02K 21/00* (2013.01); *H02K 21/12* (2013.01); *H02K 21/14* (2013.01); *H02K 21/18* (2013.01)

(58) Field of Classification Search
CPC .......... H02K 1/06; H02K 21/00; H02K 21/12; H02K 12/14; H02K 21/18
USPC ....... 310/40 MM, 46, 48, 152, 216.092, 269
IPC .............................................. H02K 1/06, 21/00
See application file for complete search history.

(56) References Cited

U.S. PATENT DOCUMENTS

| | | | |
|---|---|---|---|
| 6,822,368 B2 | 11/2004 | Maslov et al. | |
| 7,075,200 B2 | 7/2006 | Minato et al. | |
| 7,183,684 B2 | 2/2007 | Miyashita et al. | |
| 2003/0234590 A1* | 12/2003 | Gitzen | H02K 53/00 310/152 |
| 2006/0197478 A1* | 9/2006 | Wang et al. | 318/254 |
| 2007/0194647 A1* | 8/2007 | Maeda | H02K 57/006 310/152 |
| 2008/0164778 A1* | 7/2008 | Schieffer | H02K 53/00 310/152 |
| 2009/0218899 A1* | 9/2009 | Carey | H02K 53/00 310/152 |
| 2010/0141061 A1* | 6/2010 | Ramu et al. | 310/46 |
| 2011/0291512 A1* | 12/2011 | Freixas Vila | F16H 61/24 310/152 |
| 2013/0229080 A1* | 9/2013 | Jones | 310/152 |

OTHER PUBLICATIONS

S. Bentouati, Z. Q. Zhu and D. Howe, "Permanent Magnet Brushless DC Motors for Consumer Products", Ninth International Conference on Electrical Machines and Drives, IEE, 1999.*

* cited by examiner

*Primary Examiner* — John K Kim
(74) *Attorney, Agent, or Firm* — LaRiviere, Grubman PC

(57) ABSTRACT

A rotary magnetic motor having a rotor configured to magnetically interact with a stator to obtain rotation of the rotor about its axis. The stator has a magnetic structure of a generally involute shape around the axis of rotation. The stator magnetic structure has a plurality of permanent magnets defining a first magnetic face of a first polarity. The rotor has a magnetic structure of a generally circular shape around the axis and inside the stator magnetic structure. The rotor has a plurality of permanent magnets defining a second magnetic face of a second polarity. The magnetic attraction and repulsing of the aligned magnetic faces with a progressively narrowing radial gap, resulting from the involute shape, rotate the rotor inside the stator. A magnetic pulse mechanism discharges a magnetic pulse of the first polarity to provide an additional pull to continue the rotation of the rotor through its full cycle.

14 Claims, 4 Drawing Sheets

ROTARY CONTINUOUS PERMANENT MAGNET MOTOR

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to motors for producing rotational torque through an output shaft that can be used to generate electricity or perform other work. More particularly, the present invention relates to such motors that utilize magnetic force to impart the rotational torque on the output shaft. Even more particularly the present invention relates to such motors that utilize a magnetically configured rotor of one pole that rotates within an involute-shaped stator of the opposite pole.

B. Background

Motors and other machines for converting a source of input energy to an output in the form of rotational torque that is delivered through an output shaft have been available for many years. The rotational torque at the output shaft is commonly utilized to produce electricity via a generator, power a pump, grinding wheel or other machine, turn a wheel, or operate other devices. The input energy for such machines has been provided by people, animals, moving water, gravity, blowing wind, fossil fuels, nuclear materials and a variety of other sources. Over the years, there has been a desire to have machines which utilize energy from readily available, clean and renewable sources. A favored source of such input energy is magnetic force, which is supplied by electromagnets and/or permanent magnets.

One type of machine is an electromagnetic reciprocating engine that utilizes electromagnetic force as the driving force to move a piston inside a cylinder to drive a crankshaft in order to produce motion or power. A typical configuration for such engines comprises a plurality of electrical coils disposed around the cylinder which are actuated by electrical currents to provide the electromagnetic force necessary to drive the piston in a reciprocating motion in the cylinder. This type of electromagnetic engine must have a somewhat large supply of electrical current to power the coils and typically requires a complex control mechanism to provide the electrical current to the coils in a manner so as to operate the engine. For these and other practical reasons, electromagnetic reciprocating engines have generally not become very well accepted.

Another source of power that has been utilized to reciprocate a piston inside a cylinder is the magnetic energy stored in permanent magnets. As is well known, when the same polarity ends of two magnets are placed near each other the repulsion force of the two magnetic fields will repel the magnets and, conversely, when the opposite polarity ends of two magnets are placed near each other the attraction force of the magnetic fields will attract the magnets toward each other, assuming one or both of the magnets are allowed to move. A known advantage of utilizing permanent magnets as the driving force for a reciprocating motor is that the energy available from these magnets is relatively constant and capable of providing a long operating life. In order to use permanent magnets to reciprocally drive a piston inside a cylinder, however, a mechanism must be provided that first utilizes the advantage of dissimilar polarity to attract the piston to the permanent magnet and then utilize the advantage of similar polarity to drive the piston away from the permanent magnet. Naturally, this must be done in a very rapid manner. The difficulties with being able to rapidly switch polarity when using permanent magnets, as opposed to electromagnetic force, has limited the ability to utilize the advantages of permanent magnets as a driving force to reciprocate a piston in a cylinder so as to rotate an output shaft for the purposes of motion or the generation of electricity.

Permanent magnets are also utilized in rotary magnet motors. The typical rotary magnet motor has a rotor with one or more magnets thereon that are configured to interact with a stator having one or more magnets thereon of an opposite polarity to promote rotation of the rotor about an axis that is generally perpendicular to the rotor and stator. Over the years, a variety of different rotary magnet motors have been developed that seek to benefit from the attraction and repelling action of the magnets, as discussed above, without the need to switch the polarity that is required for reciprocating type motors. An example of such a rotary magnet motor is found in U.S. Pat. No. 6,822,368 to Maslov, et al., which describes a rotary permanent magnet electric motor having salient stator poles with nonuniform pole thickness in the radial direction to compensate for the effects of clogging torque. A radial air gap of uniform thickness separates the stator poles and the permanent magnet pole shoes, which are varied in shape and/or position to achieve the desired results. U.S. Pat. No. 7,183,684 to Miyashita, et al. describes a permanent magnet rotary motor having a pair of end surfaces of each rotor permanent magnet are substantially parallel to a virtual plane that extends in the radial direction of the rotor core while passing through the centers of a stator core and an arc surface. U.S. Pat. No. 7,075,200 to Minato, et al. describes a direct-driven magnetic rotating apparatus that has permanent magnet plates mounted directly to a rotational body that is rotated by magnetic repulsive force. Numerous other examples of rotary magnet motors are known to those skilled in the art.

None of the foregoing prior art devices provides a rotary magnet motor that is particularly cost effective to construct and efficient to use to produce a rotary motion that can be utilized to accomplish a work task, such as turn a generator, power a fan, rotate a wheel and the like. What is needed, therefore, is an improved rotary magnet motor that utilizes magnetic attraction and repulsion to rotate a rotor and/or an output member to accomplish the desire work activity, such as generating electricity or powering a vehicle or other equipment. The preferred rotary magnet motor will utilize the benefits of permanent magnets to rotate the rotor, having magnets of one polarity, within the general confines of the stator, having magnets of the opposite polarity. Preferably, the rotary magnet motor will be relatively simple to operate, require a limited number of moving components and be relatively inexpensive to manufacture.

SUMMARY OF THE INVENTION

The rotary continuous permanent magnet motor of the present invention solves the problems and provides the benefits identified above. That is to say, the present invention discloses an improved rotary magnet motor for use to generate electricity, drive another machine, power a vehicle or a variety of other rotary power uses. In a preferred embodiment of the present invention, the rotary magnet motor utilizes permanent magnets on the rotor and stator that are configured such that the opposite polarity of the rotor and stator causes the rotor to rotate within the confines of the stator. The preferred embodiment of the rotary magnet motor of the present invention requires a limited number of moving components and is relatively inexpensive to manufacture. The rotary magnet motor of the present invention produces rotary power that is adaptable to a wide variety of motor uses, including vehicle motion and power generation.

In one general aspect of the present invention, the rotary continuous permanent magnet motor generally comprises a stator, rotor, a rotatable supporting mechanism that rotatably supports the rotor on the stator and a magnetic pulse mechanism. In a preferred embodiment, the stator has a stator base that supports a stator magnetic structure distributed circumferentially around the stator base. The stator magnetic structure is provided in a generally involute shape about an axis of rotation for the rotor. The stator magnet structure has a first end, a second end, a stator gap between the first end and the second end and one or more first magnets, preferably permanent magnets, that define a first magnetic face. The first magnetic face is directed generally inward toward the axis of rotation and has a first polarity. The rotor has a rotor base that supports one or more rotor magnetic structures distributed in a generally circular configuration about the axis of rotation. In a preferred configuration, two rotor magnetic structures are utilized. Each of the rotor magnet structures has a first end, a second end and one or more second magnets that, collectively, define a second magnetic face. Preferably, the second magnets are also permanent magnets. The second magnetic face is directed generally toward the first magnetic face of the stator magnetic structure and has a second polarity that is opposite the first polarity. The rotor magnetic structure and the stator magnetic structure(s) define a radial gap between the first magnetic face and the second magnetic face that is configured to be progressively narrower, due to the involute shape, from the first end to the second end of the stator magnetic structure. The rotatable supporting mechanism supports the rotor base on the stator base to allow rotation of the rotor magnetic structure generally within the same plane as the stator magnetic structure with the second magnets disposed inwardly of the first magnets. The magnetic pulse mechanism is positioned at or near the first end of the stator magnetic structure, at or near the end of the stator gap, to generate a magnetic pulse of the first polarity. The magnetic pulse mechanism is operatively connected to the rotor and configured to direct the magnetic pulse toward the second magnetic face as the first end of the rotor magnetic structure is in the stator gap to provide a magnetic "kick" to the rotor to rotate it inside the stator. In a preferred embodiment, the magnetic pulse mechanism is an electromagnet that is connected to a battery and to a switch mounted on the stator base. A switch engaging mechanism engages the switch to activate or generate the magnetic pulse mechanism at specific set positions during the rotation of the rotor in the stator. An output mechanism, such as an output shaft, transfers the rotational force for use by a work object, such as a generator. In operation, the narrowing radial gap and the attraction/repulsion of the magnetic forces between the first and second magnetic faces rotates the rotor within the stator, with the electromagnet providing the additional magnetic pull to prevent equalization of the magnetic forces.

Accordingly, the primary objective of the present invention is to provide a rotary continuous permanent magnet motor that provides the advantages discussed above and overcomes the disadvantages and limitations associated with presently available rotary magnet motors.

It is also an important object of the present invention to provide a rotary magnet motor that takes advantage of the benefits of permanent magnets to rotate a rotor having one or more magnets with a magnetic face of a one polarity within the magnetic confines of a stator having one or more magnets with a magnetic face of the opposite polarity.

It is also an important object of the present invention to provide a rotary magnet motor that utilizes the benefits of a rotor having a circular shaped magnetic structure of one polarity rotating with the magnetic confines of a stator having an involute shaped magnetic structure of the opposite polarity.

It is also an important object of the present invention to provide a rotary magnet motor that rotates a rotor by the attraction and repulsion forces between permanent magnets associated with the rotor and stator and utilizes a magnetic pulse mechanism to selectively introduce a magnetic force to assist in the rotation of the rotor within the magnetic confines of the stator.

It is also an important object of the present invention to provide a rotary magnet motor that has a stator, rotor and magnetic pulse mechanism, with the stator having a generally involute shaped magnetic structure comprising one or more magnets that define a magnetic face of a first polarity and a rotor cavity, the rotor having a generally circular shaped magnetic structure comprising one or more magnets that define a magnetic face of a second polarity that rotates with the rotor cavity due to the attraction and repulsion between the two magnetic faces, and the magnetic pulse mechanism configured to provide a pulse magnetic force of the first polarity to pull the rotor through to the beginning of the involute shaped rotation cycle.

It is also an object of the present invention to provide a rotary magnet motor that is useful for providing relatively low cost, environmentally friendly rotational power to generate electricity, operate machinery, power a vehicle or accomplish other rotary power uses.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

Figure 1:
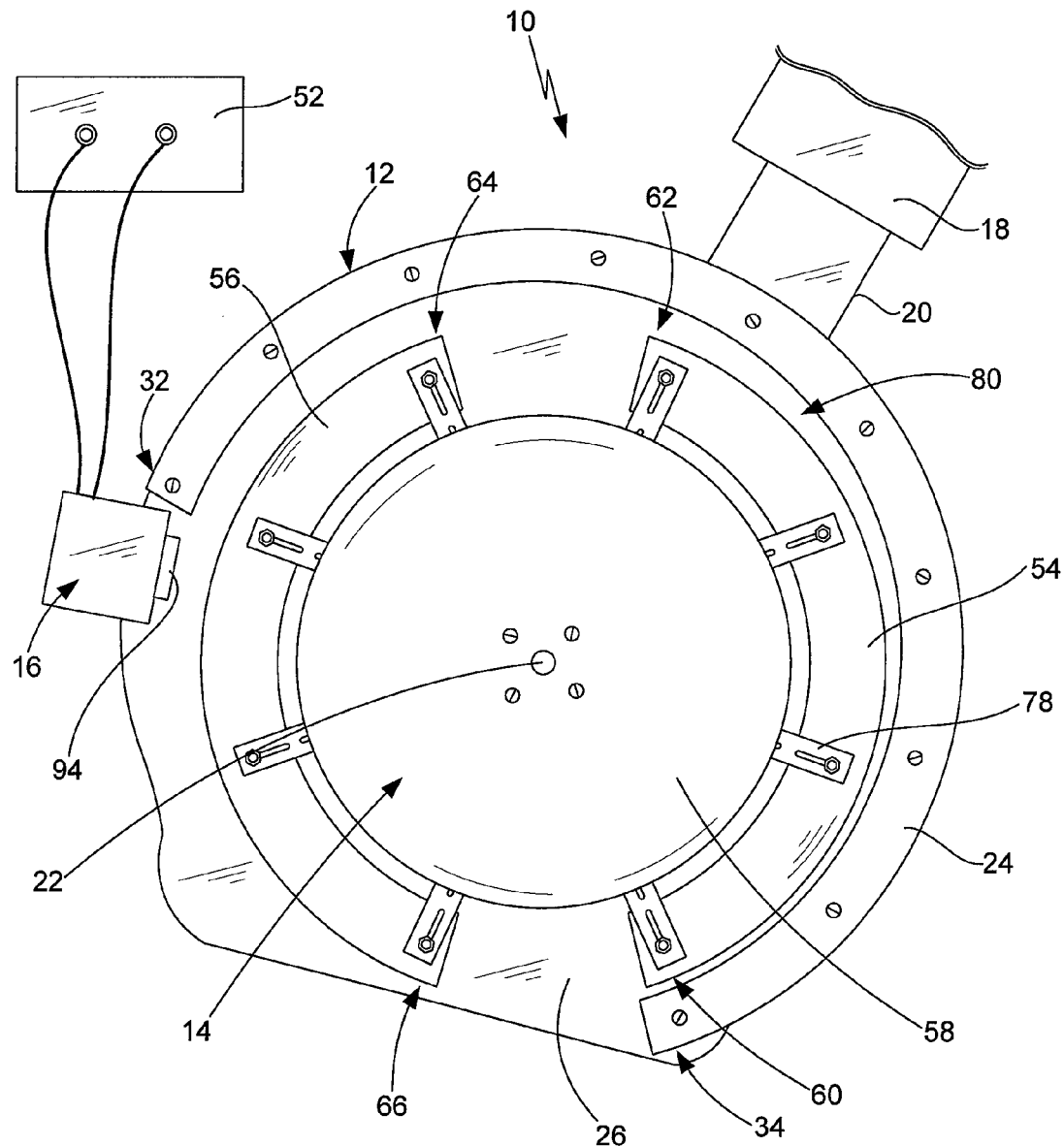
FIG. 1 is a top plan view of a rotary continuous permanent magnet motor configured according to a preferred embodiment of the present invention.

With reference to the figures where like elements have been given like numerical designations to facilitate the reader's understanding of the present invention, the preferred embodiments of the present invention are set forth below. The enclosed figures and drawings are merely illustrative of a preferred embodiment and represents one of several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein generally show and describe the motor as including base and output shaft components, those skilled in the art will readily understand that this is merely for purposes of simplifying the present disclosure and that the present invention is not so limited, as the present invention is equally applicable for use without the base structures utilizing other means of transmitting the rotation of the rotor for useful work.

A rotary continuous permanent magnet motor that is manufactured out of the components and configured pursuant to a preferred embodiment of the present invention is shown generally as 10 in the figures. Rotary magnet motor 10 generally comprises a stator 12, rotor 14 and a magnetic pulse mechanism 16 that cooperate together to rotate rotor 14 for purposes of providing rotation force for use by a generator, machine, vehicle or other such power uses. As explained in more detail below, in the preferred embodiment rotor 14 rotates within the magnetic confines of stator 12 due to the attraction and repulsion forces of permanent magnets associated with stator 12 and rotor 14 and of the magnetic force provided by magnetic pulse mechanism 16. As well known in the art, a variety of output mechanisms can be utilized with rotary magnet motor 10 to transfer the rotary power therefrom to a work object, such as the generator shown as 18 connected by belt 20 to a pulley (not shown) on the output shaft 22, best shown in FIG. 3. As further explained below, output shaft 22 is utilized herein as exemplary of an output mechanism suitable for use with rotary magnet motor 10 of the present invention.

Figure 2:
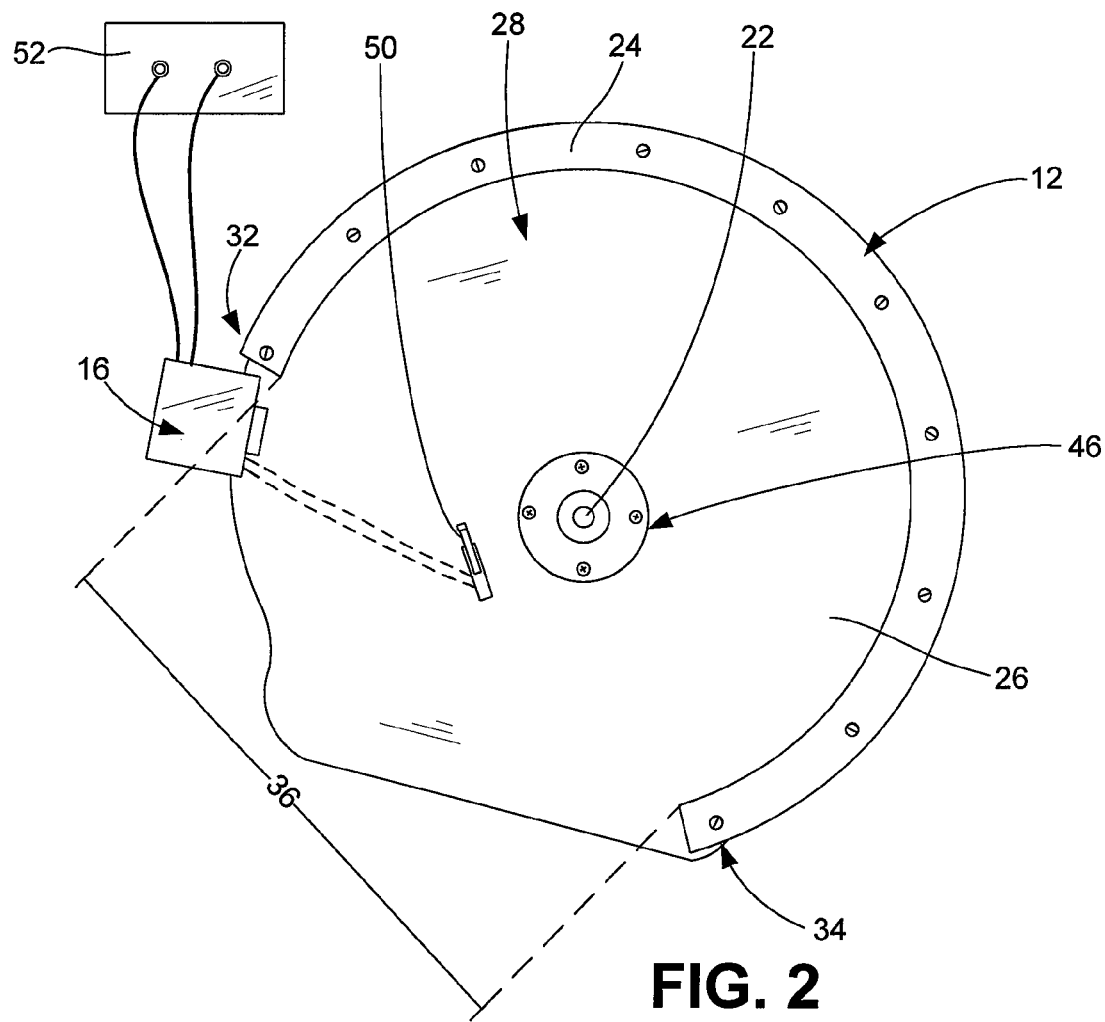
FIG. 2 is a top plan view of the stator, pulse generating mechanism and battery of the rotary magnet motor shown in FIG. 1.
Figure 3:
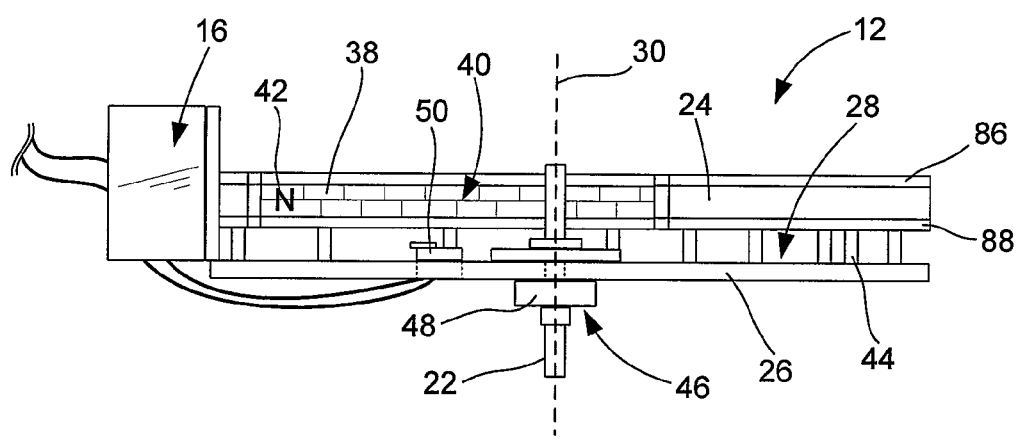
FIG. 3 is a front view of the stator and pulse generating mechanism of FIG. 2.

Stator 12, best shown in FIGS. 2 and 3, stator 12 comprises a stator magnetic structure 24 which, in the embodiment shown in the figures, is mounted on a portion of the outer periphery of stator base 26 to define a rotor cavity 28. Stator magnetic structure 24 is distributed in a generally involute configuration around the axis of rotation 30 (shown in FIGS. 3 and 6) such that, as explained below, it cooperates with rotor 14 to rotate rotor 14 within rotor cavity 28. Stator magnetic structure 24 has a first end 32, a second end 34 and a stator gap 36 between the first 32 and second 34 ends thereof, as best shown in FIG. 2. As best shown in FIG. 3, stator magnetic structure 24 comprises one or more first magnets 38 that define a first magnetic face 40 that is directed inward toward the axis of rotation 30 and rotor cavity 28 so that it may cooperatively engage rotor 14 to rotate rotor 14. In the embodiment shown in the figures, stator magnetic structure 24 comprises a plurality of first magnets 38 that are distributed throughout stator magnetic structure 24. The first magnets 38 are configured such that first magnetic face 40 has a uniform polarity facing inward (e.g., toward axis of rotation 30), identified as a first polarity 42. In one configuration, utilized for exemplary purposes herein, first polarity 42 is north (N), as shown in FIG. 3. In the embodiment shown, stator base 26 supports the stator magnetic structure 24 in spaced apart relation to stator base 26 by utilizing a plurality of support members 44, as shown in FIG. 3. Support members 44 are utilized so that the first magnetic face 40 will be generally in the same plane as the magnetic face of rotor 14, which is rotatably supported on stator base by a rotatable supporting mechanism 46, such as the bearing 48 described below.

In the embodiment shown in the figures, stator base 26 also supports switch 50 and magnetic pulse mechanism 16. Switch 50 connects magnetic pulse mechanism 16 and battery 52 such that, as explained below, the rotation of rotor 14 engages switch 50 to activate magnetic pulse mechanism 16. Battery 52 supplies power for the operation of magnetic pulse mechanism 16. In a preferred embodiment, battery 52 is continuously charged by utilizing a portion of the power generated by rotary magnet motor 10 of the present invention. Alternatively, battery 52 may be charged by utilizing solar or other power sources and/or the power necessary for magnetic pulse mechanism 16 may be supplied by a source of power other than battery 52, such as an electrical outlet.

In the embodiment shown in the figures, rotor 14 comprises one or more rotor magnetic structures, such as the first rotor magnetic structure 54 and the second magnetic structure 56 that, are supported around the periphery of rotor base 58. Other embodiments of rotary magnet motor 10 of the present invention can utilize one or more than two rotor magnetic structures and not utilize the rotor base 58. The first 54 and second 56 rotor magnetic structures are distributed in a generally circular configuration around the axis of rotation 30 so that they may cooperate, as explained in more detail below, with the involute shape of the stator magnetic structure 24 to cause rotor 14 to rotate within rotor cavity 28. First rotor magnetic structure 54 has a first or leading end 60 and a second or following end 62 and second rotor magnetic structure 56 has a first or leading end 64 and a second or following end 66. Between first end 60 of first rotor magnetic structure 54 and second end 66 of second rotor magnetic structure 56 is first rotor gap 68 and between first end 64 of second rotor magnetic structure 56 and second end 62 of first rotor magnetic structure 54 is second rotor gap 70. In one embodiment, both first 68 and second 70 rotor gaps are approximately 35 degrees of the circle formed by rotor magnetic structures 54 and 56.

Figure 6:
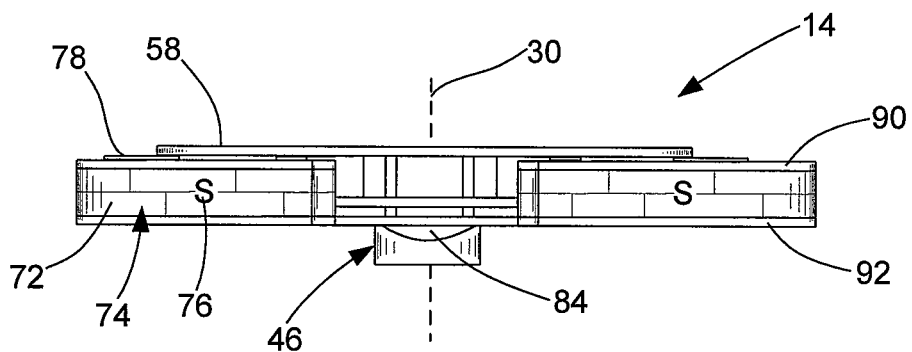
FIG. 6 is a front view of the rotor of FIG. 4.

As best shown in FIG. 6, rotor magnetic structures 54/56 both comprise one or more second magnets 72 that define a second magnetic face 74 that is directed outward, away from the axis of rotation 30, towards the first magnetic face 40 of the stator magnetic structure 24 so that the rotor 14 may magnetically cooperate with stator 12 to rotate rotor 14 with in rotor cavity 28. In the embodiment shown in the figures, rotor magnetic structures 54/56 comprise a plurality of second magnets 72 that are distributed throughout the rotor magnetic structures 54/56. The second magnets 72 are configured such that second magnetic face 74 has a uniform polarity facing outward (e.g., away from axis 30 and toward first magnetic face 40), identified as a second polarity 76 that is opposite that of first polarity 42. In the configuration shown in the figures, utilized for exemplary purposes, second polarity 76 is south (S) because first polarity 42 is north. In the embodiment shown, rotor base 58 supports first 54 and second 56 rotor magnetic structures at its periphery by utilizing a plurality of bracket members 78 that place the rotor magnetic structures 54/56 in the desired circular configuration. Rotor base 58 and bracket members 78 are configured to extend rotor magnetic structures 54/56 outward from rotor base 58 such that they will be in the same plane as first magnetic face 40 of stator 12 and to define the radial gap 80, best shown on FIG. 1, between the stator 12 and rotor 14. As a result of the involute shape of stator magnetic structure 24 and the round shape of the rotor magnetic structures 54/56, and to achieve the rotary benefits of the present invention, radial gap 80 is of varying width. As shown on FIG. 1, radial gap 80 becomes progressively narrower from the first end 32 to the second end 34 of stator magnetic structure 24. As a result of this configuration, first magnetic face 40 and second magnetic face 74 are the spaced apart the furthest at first end 32 of stator magnetic structure 24 and are spaced apart the closest at second end 34 of stator magnetic structure 24. As explained below, the progressively narrowing configuration of radial gap 80 from the first 32 to the second 34 ends of stator magnetic structure 24 is important to the beneficial operation of the rotary magnet motor 10 of the present invention.

Figure 4:
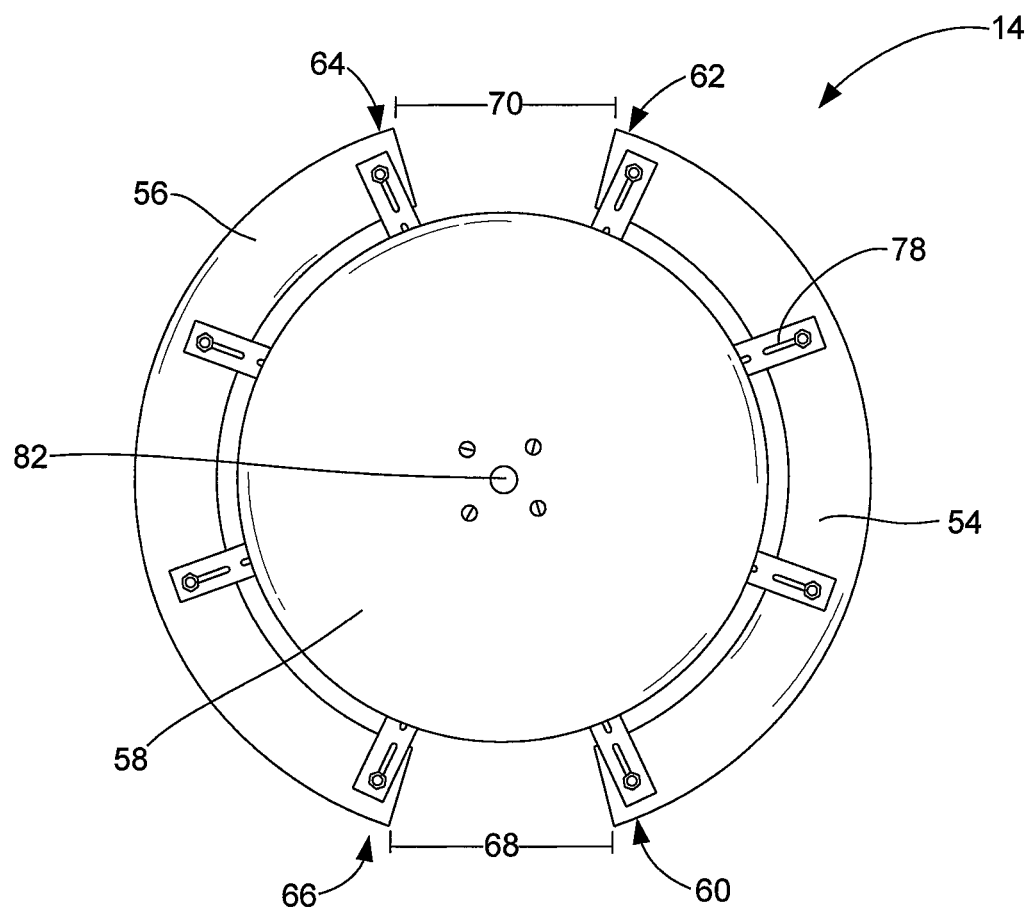
FIG. 4 is a top plan view of the rotor of the rotary magnet motor shown in FIG. 1.
Figure 5:
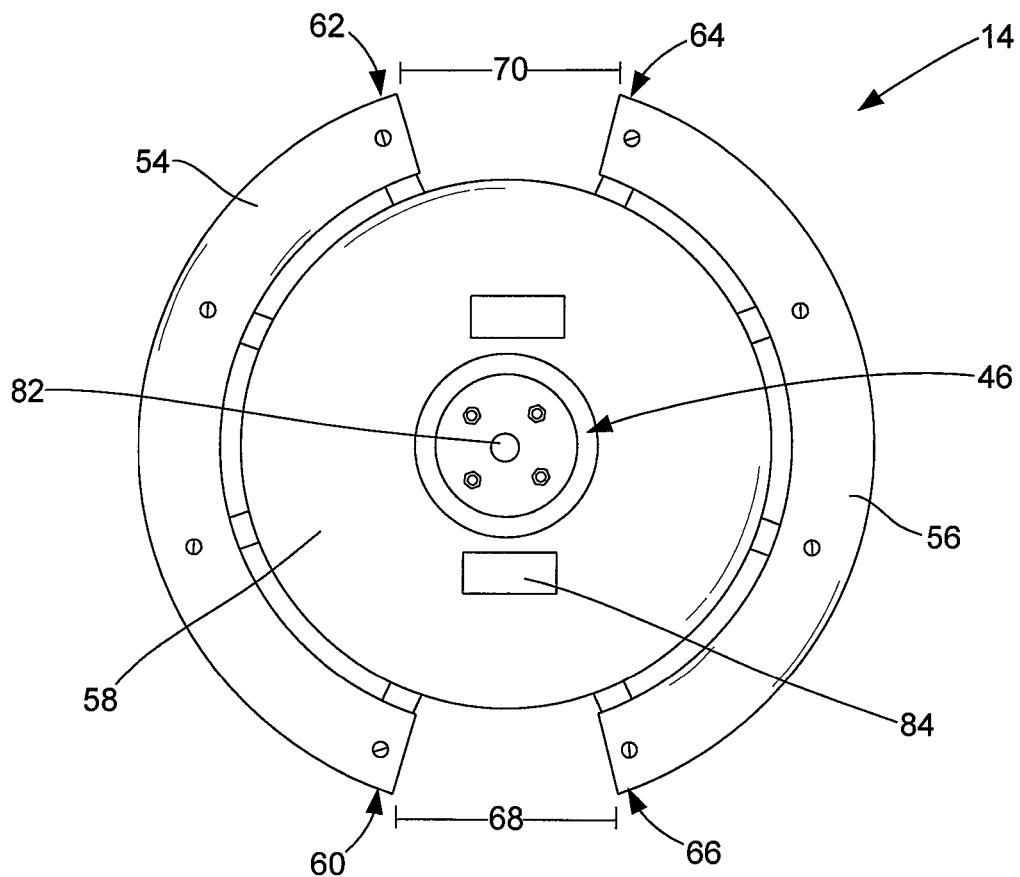
FIG. 5 is a bottom plan view of the rotor of FIG. 4.

As best shown in FIGS. 4 and 5, rotor base 58 also supports a portion of the rotatable supporting mechanism 46, which includes a center aperture 82 for receiving output shaft 22, and a switch engaging mechanism 84 configured to engage switch 50 and activate magnetic pulse mechanism 16. The portion of rotatable supporting mechanism 46 on rotor base 58 is configured to engage output shaft 22 such that the rotation of rotor 14 from the operation of rotary magnet motor 10 will rotate output shaft 22, which then can connect to a work object, such as the generator 18, via a belt 20 or other connecting members. Alternatively, output mechanism 22 can be a flywheel, pulley or like object that is attached to rotor 14 such that it rotates with rotor 14 to accomplish the desired work object 18 operation, resulting in the shaft serving as a component of the rotatable supporting mechanism 46. In another alternative configuration, the work object 18 itself can be connected directly to rotor 14 (e.g., the rotor base 58) to rotate therewith. An example of such a configuration would be a fan as the work object 18 that is directly connected to rotor base 58. In the configuration shown in the figures, switch engaging mechanism 84 comprises a pair of outwardly projecting members positioned on the bottom surface of rotor base 58 to engage switch 50 as the rotor base 58 rotates over the stator base 26 on which the switch 50 is mounted. Typically, a switch engaging mechanism 84 will be required for each rotor gap, such as the first rotor gap 68 and second rotor gap 70, so that switch 50 will be engaged to activate magnetic pulse mechanism 16 at specific points in the rotational cycle of rotor 14. As will be readily apparent to those skilled in the present art, a variety of different types of switches 50 and cooperatively configured switch engaging mechanisms 84 can be utilized with the rotary magnet motor 10. In addition, switch 50 and switch engaging mechanisms 84 can be positioned elsewhere on stator 12 and/or rotor 14.

In the preferred embodiment of the present invention, first magnets 38 and second magnets 72 are permanent magnets, such as rare earth magnets that are known for their improved magnetic performance and longevity. The rare earth magnets are made from alloys of rare earth elements and are generally substantially stronger than ferrite or aluminum-nickle-cobalt (alnico) magnets Rare earth magnets, such as samarium magnets (SmCo) and, more preferably, neodymium magnets (NdFeB), are known to provide the characteristics desired for the operation of rotary magnet motor 10 of the present invention. If desired, the first magnets 38 may be encased between an upper stator plate 86 and a lower stator plate 88, shown in FIG. 3, that may be made out of metal or like material. Second magnets 72 may be encased between an upper rotor plate 90 and a lower rotor plate 92, shown in FIG. 6, that may also be made out of metal or like material. Preferably, stator base 26, rotor base 58 and the various other components of rotary magnet motor 10 are made out of nonferromagnetic material, such as aluminum, ceramic, carbon fiber, plastics, thermoplastic resins (such as nylon and polyfluroethylene), carbon composites and a variety of non-magnetic materials so as to not interfere with magnets 38/72 and the magnetic forces generated thereby.

The rotatable supporting mechanism 16 should be configured to rotatably support the rotor magnetic structures 54/56 within the same plane as the stator magnetic structure 24 so the first magnetic face 40 of stator 12 is substantially aligned with the second magnetic face 74 of rotor 14 as rotor 14 rotates within rotor cavity 28. In a preferred configuration, rotatable supporting mechanism 46 comprises a low friction bearing 48 mounted on stator base 26 that is attached to output shaft 22, which is connected to the component of rotatable supporting mechanism mounted on rotor base 58 such that output shaft 22 rotates with the rotating rotor 14. In effect, the bearing 48, bases 26/58 and output shaft 22 work together to beneficially support rotor 14 on stator 12 during the operation of rotary magnet motor 10. Various other configurations and components can be utilized with rotary magnet motor 10 to allow rotor 14 to rotate relative to stator 12 with their respective magnetic faces 40/74 aligned and with as little amount of friction as may be practical.

The preferred embodiment of the present invention also includes a magnetic pulse mechanism 16 configured to generate and discharge a magnetic pulse at the appropriate positions during the revolution of rotor 14 around the axis of rotation 30. In a preferred configuration, the magnetic pulse mechanism 16 comprises a pulse electromagnet, shown as 94 in FIG. 1, that is positioned to discharge a magnetic pulse of the first polarity 42 toward the second magnetic face 74 of the rotor magnetic structures 54/56. In one embodiment, the power for magnetic pulse mechanism 16 is provided by battery 52 and activated by switch 50, which is engaged by switch engaging mechanisms 84 on the bottom surface of rotor base 58. As set forth below, the positioning of the switch engaging mechanism 84 is selected to activate switch 50 to power magnetic pulse mechanism 16 and discharge a pulse from pulse electromagnet 94 when the first ends 60/64 of rotor magnetic structures 54/56 are at a certain position in their rotational cycle.

In operation, the rotor 14 is placed inside rotor cavity 28 of stator 12 with output shaft 22 extending upwardly through the aperture 82 in rotatable supporting mechanism 46 so that rotor 14 is free to rotate within stator 12. With rotor 82 in position on rotatable supporting mechanism 46, the first magnetic face 40 of stator 12 will be substantially aligned with the second magnetic face 74 of rotor 14. With battery 52 disconnected or magnetic pulse mechanism 16 otherwise disconnected or switched off, manual rotation of rotor 14 will result in rotor 14 rotating in rotor cavity 28 until the magnetic force reaches an equilibrium, at which point the rotor 14 will cease rotating and be at a standstill. To operate rotary magnet motor 10 magnetic pulse mechanism 16 must be activated. With battery 52 connected and magnetic pulse mechanism 16 otherwise connected and switched on, an initial manual rotation of rotor 14 will result in rotary magnet motor 10 operating. As rotor 14 rotates, the switch engaging mechanism on the underside of rotor base 58 will engage switch 50 at the appropriate positions to activate magnetic pulse mechanism 16 to generate a magnetic pulse from pulse electromagnet 94. The narrowing radial gap 80 resulting from the circular rotor magnetic structures 54/58 in the involute stator magnetic structure 24 and the opposite polarities of first magnetic face 40 (first polarity) and second magnetic face 74 (second polarity) will pull the rotor magnetic structures 54/56 around to rotate rotor 14. The magnetic pulse from the magnetic pulse mechanism 16 will provide a magnetic "kick" to continue rotating the rotor magnetic structures 54/56 once they pass the second end 34 of the stator magnetic structure 24.

More specifically, an example of the rotation of rotor 14 starting with the first end 60 of first rotor magnetic structure 54 at the mid-point between first 32 and second 34 ends of stator magnetic structure 24, the magnetic force in the narrowing radial gap 80 will pull first end 60 of first rotor magnetic structure 54 toward and past, by way of momentum override, the second end 34 of stator magnetic structure 24 into stator gap 32. When first end 60 of first rotor magnetic structure 54 approaches near the magnetic pulse mechanism 16 positioned at the first end 32 of stator magnetic structure 24, the switch engaging mechanism 84 will engage switch 50 to activate magnetic pulse mechanism 16 and discharge a short, quick magnetic pulse from pulse electromagnet 94 so as to pull the first end 60 of first rotor magnetic structure 54 towards and past the first end 32 of stator magnetic structure 24. With the first end 60 of first rotor magnetic structure 54 going towards and past the first end 32 of stator magnetic structure, the first end 64 of second rotor magnetic structure 56 will be pulled towards the second end 34 of stator magnetic structure by the progressively narrowing radial gap 80. The first end 64 of second rotor magnetic structure 56 will then enter the stator gap 36 and, at the appropriate position, be pulled by the magnetic "kick" from pulse electromagnet 94 of magnetic pulse mechanism 16 towards and past the first end 32 of stator magnetic structure 24. This will position the first end 60 of first rotor magnetic structure at a point where the narrowing radial gap 80 will pull it towards and past second end 34 of stator magnetic structure, thereby completing a full rotational cycle of rotary magnet motor 10.

Various alternative configurations for rotary magnet motor 10 of the present invention are possible. For instance, either or both stator 12 and rotor 14 can be configured without stator base 26 and rotor base 58, respectively. Rotary magnet motor 10 can be configured with various other mechanisms to position stator magnet structure 24, with its first magnetic face 40 of first polarity, relative to rotor magnet structures 54/56, with their second magnetic face 74, to achieve the desired rotation of rotor 14 within the magnetic confines of stator 12. Various other types of magnetic pulse mechanisms 16, other than a battery-powered electromagnet, can be utilized to provide the necessary magnetic "kick" to complete the rotation of rotor 14 within stator 12. Likewise, different materials and configurations for the various components can be utilized with rotary magnet motor 10 and still achieve the rotary power benefits of the present invention.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A rotary magnet motor comprising:
   a stator having a stator magnetic structure distributed in a generally involute configuration about an axis of rotation to define a rotor cavity, said stator magnet structure having a first end, a second end, a stator gap between said first end and said second end, and one or more first magnets defining a first magnetic face directed generally inward toward said axis of rotation, said first magnetic face having a first polarity;
   a rotor having one or more rotor magnetic structures distributed in a generally circular configuration about said axis of rotation and disposed in said rotor cavity, each of said rotor magnet structures having a first end, a second end and one or more second magnets defining a second magnetic face directed generally toward said first magnetic face of said stator magnetic structure, said second magnetic face having a second polarity opposite said first polarity;
   means for rotatably supporting said rotor magnetic structure generally within the same plane as said stator magnetic structure to allow rotation of said second magnets inwardly of said first magnets;
   means at said first end of said stator magnetic structure for generating a magnetic pulse of said first polarity, said magnetic pulse generating means operatively connected to a stator base and configured to direct said magnetic pulse toward said second magnetic face when said first end of said rotor magnetic structure is in said stator gap; and
   each of said first magnets and said second magnets are permanent magnets.

2. The rotary magnet motor according to claim 1, wherein said magnetic pulse generating means is an electromagnet.

3. The rotary magnet motor according to claim 2, wherein said electromagnet is connected to a switch operatively engaged with said rotor to activate said electromagnet.

4. The rotary magnet motor according to claim 1, wherein said magnetic pulse means is connected to a switch operatively engaged with said rotor to activate said magnetic pulse means.

5. The rotary magnet motor according to claim 4, wherein said rotor has a means for engaging said switch that is positioned to activate said magnetic pulse means at one or more set positions.

6. The rotary magnet motor according to claim 1, wherein said supporting means comprises a bearing.

7. The rotary magnet motor according to claim 1, wherein said rotor magnetic structure and said stator magnetic structure define a radial gap between said first magnetic face and said second magnetic face, said radial gap configured to be progressively narrower from said first end to said second end of said stator magnetic structure.

8. The rotary magnet motor according to claim 1 further comprising an output member interconnecting a work machine with said supporting means or said rotor.

9. A rotary magnet motor comprising:
- a stator having a stator base supporting a stator magnetic structure distributed circumferentially in a generally involute configuration about an axis of rotation, said stator magnet structure having a first end, a second end, a stator gap between said first end and said second end, and one or more first magnets defining a first magnetic face directed generally inward toward said axis of rotation, said first magnetic face having a first polarity;
- a rotor having a rotor base supporting one or more rotor magnetic structures distributed in a generally circular configuration about said axis of rotation, each of said rotor magnet structures having a first end, a second end and one or more second magnets defining a second magnetic face directed generally toward said first magnetic face of said stator magnetic structure, said second magnetic face having a second polarity opposite said first polarity, said rotor magnetic structure and said stator magnetic structure defining a radial gap between said first magnetic face and said second magnetic face, said radial gap configured to be progressively narrower from said first end to said second end of said stator magnetic structure;
- means for rotatably supporting said rotor base on said stator base to allow rotation of said rotor magnetic structure generally within the same plane as said stator magnetic structure to allow said second magnets inwardly of said first magnets;
- means at said first end of said stator magnetic structure for generating a magnetic pulse of said first polarity, said magnetic pulse generating means being an electromagnet, operatively connected to said stator base and configured to direct said magnetic pulse toward said second magnetic face as said first end of said rotor magnetic structure is in said stator gap; and
- each of said first magnets and said second magnets are permanent magnets.

10. The rotary magnet motor according to claim 9, wherein said electromagnet is connected to a switch operatively engaged with said rotor to activate said electromagnet.

11. The rotary magnet motor according to claim 9, wherein said magnetic pulse means is connected to a switch operatively engaged with said rotor to activate said magnetic pulse means.

12. The rotary magnet motor according to claim 11, wherein said rotor has a means for engaging said switch that is positioned to activate said magnetic pulse means at one or more set positions.

13. The rotary magnet motor according to claim 9 further comprising an output member interconnecting a work machine with said supporting means or said rotor.

14. A rotary magnet motor comprising:
- a stator having a stator base supporting a stator magnetic structure distributed circumferentially in a generally involute configuration about an axis of rotation, said stator magnet structure having a first end, a second end, a stator gap between said first end and said second end, one or more first magnets defining a first magnetic face directed generally inward toward said axis of rotation, said first magnetic face having a first polarity;
- a rotor having a rotor base supporting one or more rotor agnetic structures distributed in a generally circular configuration about said axis of rotation, each of said rotor magnetic structures generally within the same plane as said stator magnetic structure, each of said rotor magnet structures having a first end, a second end and one or more second magnets defining a second magnetic face directed generally toward said first magnetic face of said stator magnetic structure, said second magnetic face having a second polarity opposite said first polarity, said rotor magnetic structure and said stator magnetic structure defining a radial gap between said first magnetic face and said second magnetic face, said radial gap configured to be progressively narrower from said first end to said second end of said stator magnetic structure;
- a bearing rotatably supporting said rotor base on said stator base;
- a pulse electromagnet at said first end of said stator magnetic structure configured to generate a magnetic pulse of said first polarity, said pulse electromagnet operatively connected to a source of power and said stator base, said pulse electromagnet configured to direct said magnetic pulse toward said second magnetic face as said first end of said rotor magnetic structure is in said stator gap, said pulse electromagnet is connected to a switch opertatively engaged with said rotor to activate said electromagnet;
- an output member interconnecting a work machine with said bearing or said rotor;
- each of said first magnets and said second magnets are permanent magnets; and
- said rotor has a means for engaging said switch that is positioned to activate said pulse electromagnet at one or more set positions.

\* \* \* \* \*